(12) United States Patent
Yeo

(10) Patent No.: US 6,648,796 B2
(45) Date of Patent: Nov. 18, 2003

(54) METHOD FOR CONTROLLING A DAMPER CLUTCH OF AN AUTOMATIC TRANSMISSION

(75) Inventor: Chang-Gi Yeo, Kyungki-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/964,089

(22) Filed: Sep. 25, 2001

(65) Prior Publication Data
US 2002/0037789 A1 Mar. 28, 2002

(30) Foreign Application Priority Data
Sep. 25, 2000 (KR) .......................... 2000-56126

(51) Int. Cl.⁷ ................... F16H 61/58; B60K 41/02
(52) U.S. Cl. ..................... 477/64; 477/80; 477/169
(58) Field of Search ..................... 477/64, 70, 80, 477/86, 169, 175, 180; 701/67, 64

(56) References Cited

U.S. PATENT DOCUMENTS

| 5,730,683 | A | * | 3/1998 | Usuki et al. ................. 477/143 |
| 5,733,223 | A | * | 3/1998 | Matsubara et al. ......... 477/169 |
| 5,779,595 | A | * | 7/1998 | Kono et al. .................. 477/174 |
| 5,975,262 | A | * | 11/1999 | Saito et al. .................. 192/3.31 |
| 6,036,619 | A | * | 3/2000 | Tashiro et al. .............. 477/154 |
| 6,264,580 | B1 | * | 7/2001 | Tabata et al. ............... 477/149 |

* cited by examiner

Primary Examiner—Tisha D Lewis
(74) Attorney, Agent, or Firm—Christie, Parker & Hale, LLP

(57) ABSTRACT

A method for controlling a damper clutch release control system which performs duty control in releasing a damper clutch for down-shifting in a sports mode decreasing gear-shift shock, is provided. The method requires determining whether a down-shift signal is inputted in a state when a gear shift mode is a sports mode and a throttle valve opening angle is within a predetermined range, and performing duty control until a transmission control outputs a down-shift start signal to a transmission when it is determined that the down-shift signal is inputted.

7 Claims, 3 Drawing Sheets

METHOD FOR CONTROLLING A DAMPER CLUTCH OF AN AUTOMATIC TRANSMISSION

CROSS-REFERENCE TO RELATED APPLICATION

This application claims priority of Korea patent Application No. 10-2000-0056126, filed on Sep. 25, 2000.

BACKGROUND OF THE INVENTION (a) Field of the Invention

The present invention relates to a method for controlling a damper clutch of an automatic transmission, and more particularly, to a method for performing duty control in releasing the damper clutch when a down-shift is executed when an accelerator pedal is depressed in a sports mode and thereby reducing a gear-shift (b) Description of the Related Art Generally, an automatic transmission automatically shifts gears according to a driving state. However, a driver can directly input a gear-shift signal into the automatic transmission if necessary.

The gear-shift signal inputted by a driver is divided into an 'up-shift' signal by which the gear shifts upward and a 'down-shift' signal by which the gear shifts downward.

The gear-shift signal is inputted by moving a shift lever from a general shift mode column comprising P-R-N-D to a sports mode column. The sports mode is provided with means for generating '+' or '−' signals for shifting gears. Therefore, the gear-shift signal can be generated by a manipulation of the shift lever, and the generated gear-shift signal is inputted into a transmission control means.

In the automatic transmission, engine torque is transmitted to the transmission via a torque converter. The torque converter transmits engine torque through a flow of working fluid, and therefore slip occurs, but a damper clutch is provided inside the torque converter to reduce this slip. In some driving states, the engine and the transmission are directly coupled by an operation of the damper clutch, and thereby fuel mileage and a power transmission ratio are improved.

When the transmission control means receives a down-shift signal from a driver in the sports mode, the transmission control means immediately releases the damper clutch.

However, if the down-shift signal is inputted in a state when an accelerator pedal is depressed, the transmission control means determines a down-shift and immediately releases the damper clutch. Therefore, a difference between the engine speed at the point when the shift is completed and the engine speed at the point the shift is started is substantial, and thus gear-shift shock occurs.

SUMMARY OF THE INVENTION

Therefore, the present invention relates to a method to solve the above problem, and it is an object of the present invention to provide a method for controlling a damper clutch by which, in performing a down-shift during the accelerator pedal being depressed in a sports mode, a transmission control means releases the damper clutch under duty control and thereby reduces the gear-shift shock.

To achieve the object above, a damper clutch release control system comprises:

a throttle position sensor for detecting an opening angle of a throttle valve;

a sports mode detecting means for detecting whether a shift lever is in a sports mode column;

a gear-shift signal detecting means for detecting a gear-shift signal generated by manipulation of the shift lever;

a damper clutch controlling the power transmission between the engine and the transmission, the damper clutch being installed inside a torque converter transmitting the rotating power of the engine to the transmission; and a transmission control means for controlling an operation of the damper clutch through having inputted data from the throttle position sensor, sports mode detecting means and gear-shift signal detecting means.

Using the above system, the method for controlling the damper clutch by the transmission control means comprises:

(a) determining whether the down-shift signal is inputted in a state when a gear shift mode is a sports mode and a throttle valve opening angle is within a predetermined range; and (b) performing duty control until the transmission control means outputs a down-shift start signal to the transmission if it is determined that the down-shift signal is inputted.

DETAILED DESCRIPTION OF THE PREFERRED EMBODIMENTS

Hereinafter, the preferred embodiment of the present invention will be described in detail with reference to the accompanying drawings.

Figure 1:
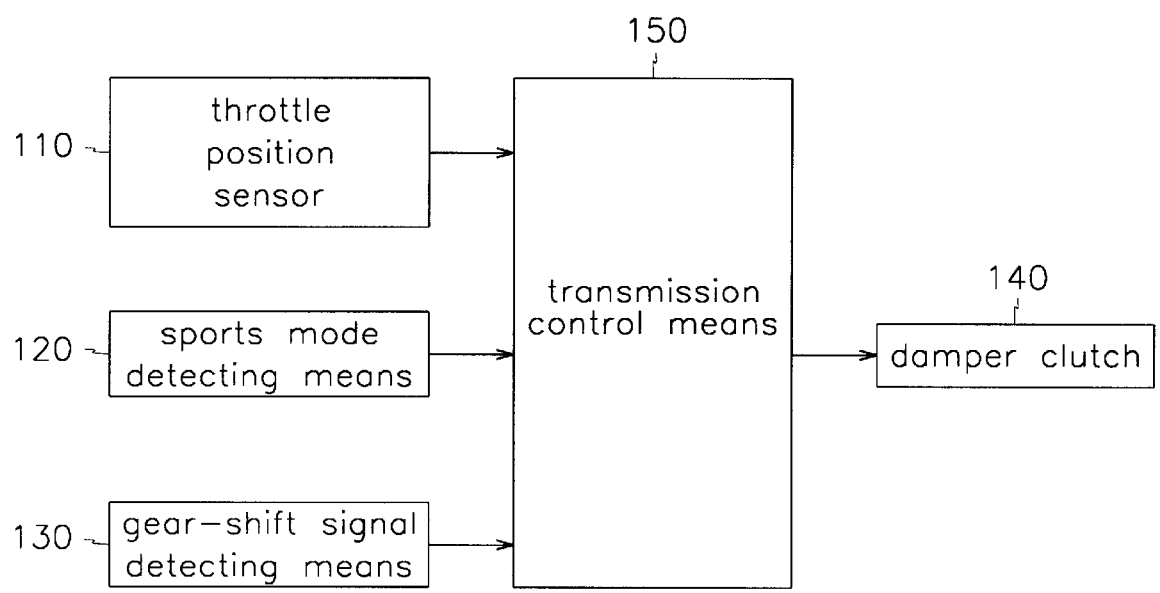
FIG. 1 is a block diagram showing a system of a method for controlling the damper clutch according to a preferred embodiment of the present invention.

FIG. 1 is a block diagram showing a system of a method for controlling a damper clutch according to the preferred embodiment of the present invention.

As shown in FIG. 1, a damper clutch release control system according to the preferred embodiment of the present invention comprises a throttle position sensor 110 for detecting an opening angle of a throttle valve, a sports mode detecting means 120 for detecting whether a shift lever is in a sports mode column, a gear-shift signal detecting means 130 for detecting a gear-shift signal generated by manipulation of the shift lever, a damper clutch 140 controlling power transmission between an engine and a transmission, the damper clutch being installed inside a torque converter transmitting engine torque to the transmission, and a transmission control means 150 for controlling operation of the damper clutch 140 by having data inputted from the throttle position sensor 110, the sports mode detecting means 120 and the gear-shift signal detecting means 130.

Figure 2:
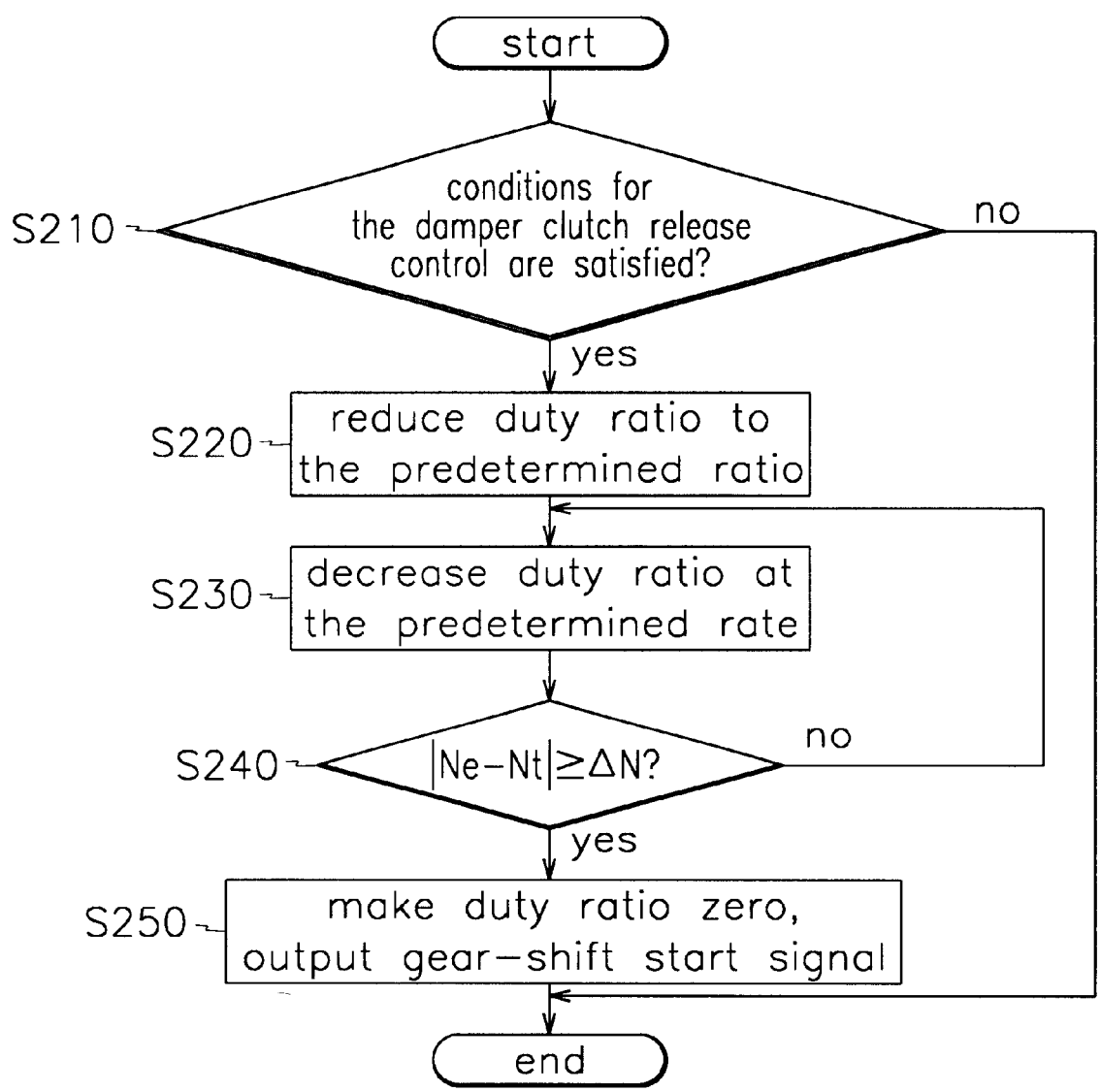
FIG. 2 is a flowchart showing a damper clutch release control method according to the preferred embodiment of the invention.

FIG. 2 is a flowchart showing a damper clutch release control method according to the preferred embodiment according to the present invention.

First, the transmission control means 150 determines whether conditions for the damper clutch release control are satisfied (S210), the conditions being that an opening angle of the throttle valve is within a predetermined range, the shift mode is a sports mode, and the down-shift signal is inputted.

The predetermined range of the throttle valve can be differently determined according to driving states, and by way of example, it can be set as a range in which the TPS output value is 0.859V through 1.992V.

If the shift lever is in the sports mode column, the shift mode is determined to be the sports mode. Also, if the driver inputs the down-shift signal by manipulation of the shift lever, it is determined that the down-shift signal is inputted.

If the conditions for the release control are not satisfied, the damper clutch release control comes to an end.

If the conditions for the release control are satisfied, the damper clutch duty ratio is immediately reduced to the predetermined ratio when it has been determined that the down-shift signal is inputted (S220).

If the duty ratio is reduced, the engine speed can increase. The predetermined ratio can be set as an arbitrary ratio based on the needed engine speed, and by way of example, it can be set as 47.5%.

After the transmission control means 150 reduces the duty ratio to the predetermined ratio, the transmission control means 150 decreases the duty ratio at a predetermined rate (S230). The predetermined rate can be set as an arbitrary rate of decrease, and by way of example, it can be set as 0.061%/msec.

The transmission control means 150 calculates a difference between engine speed (Ne) and turbine speed (Nt) and then determines whether the difference is greater than or equal to a predetermined value ($\Delta$N) (S240). Here, if the difference is smaller than the predetermined value ($\Delta$N; for example, 100 RPM), the transmission control means 150 continues performing the duty control (S230). If the difference is greater than or equal to the predetermined value ($\Delta$N), the transmission control means 150 makes the duty ratio of the damper clutch zero and outputs a gear-shift start signal to the transmission (S250).

After the gear-shift start signal is outputted, the damper clutch release control method according to the preferred embodiment of the present invention comes to an end.

Figure 3:
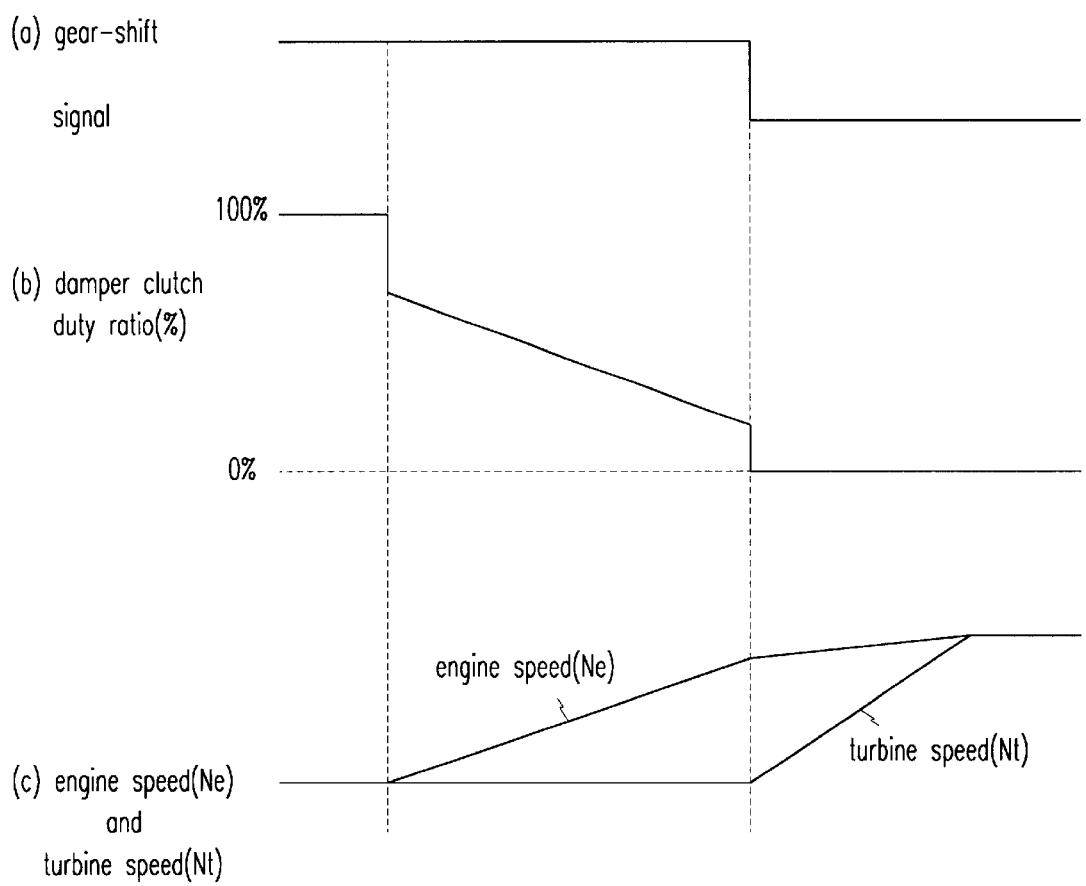
FIG. 3 is a graph showing a result of damper clutch release control according to the preferred embodiment of the invention.

FIG. 3 is a graph showing a result of damper clutch release control according to the preferred embodiment of the present invention.

As shown in section (c) of FIG. 3, before determining the gear-shift signal in the sports mode during the power-on state, the damper clutch operates, and therefore the engine speed (Ne) and the turbine speed (Nt) are the same value.

At this time, if a driver shifts the shift lever down, as shown in section (b) of FIG. 3, the transmission control means 150 immediately reduces the duty ratio of the damper clutch to the predetermined ratio with the determination of the gear-shift signal and then decreases the duty ratio at the predetermined rate.

Therefore, as shown in section (c) of FIG. 3, the engine speed (Ne) becomes greater than the turbine speed (Nt). If the difference between the engine speed and the turbine speed is greater than or equal to the predetermined value ($\Delta$N), the transmission control means 150 outputs the gear-shift signal and simultaneously makes the duty ratio of the damper clutch zero, and thereby the damper clutch 140 is completely released.

Thus, gear-shifting is accomplished. Also, the turbine speed (Nt) increases to be equal to the engine speed (Ne), and thereby the shock of the gear-shift decreases.

While the present invention has been described in detail with reference to the preferred embodiment, those skilled in the art will appreciate that various modifications and substitutions can be made thereto without departing from the spirit and scope of the present invention as set forth in the ap ended claims.

According to the preferred embodiment of the present invention, when the down-shift is performed when the accelerator pedal is depressed in the sports mode, the duty control for the damper clutch is performed and thereby the shock of gear-shifting decreases.

What is claimed is:

1. A method for controlling a damper clutch for an automatic transmission comprising:

determining whether a down-shift signal has been input when in a sports mode during a power-on state; and controlling a duty of the damper clutch to be gradually decreased at a predetermined rate until a transmission control unit outputs a down-shift start signal when it is determined that the down-shift signal has been input.

2. The method as claimed in claim 1 wherein controlling the duty of the damper clutch comprises:

immediately reducing a duty ratio of the damper clutch to a predetermined value when it is determined that the down-shift signal has been input;

decreasing the duty ratio of the clutch at a predetermined rate; and simultaneously making the duty ratio zero and outputting the down-shift start signal to the transmission.

3. The method of claim 2 wherein the down-shift start signal is outputted if a difference between an engine speed and a turbine speed is greater than or equal to a predetermined value.

4. A method for controlling a damper clutch for an automatic transmission comprising:

(a) determining whether a down-shift signal has been input when a gear shift mode is a sports mode and a throttle valve opening angle is within a predetermined range; and (b) immediately reducing a duty ratio of the damper clutch to a predetermined value when it is determined that the down-shift signal has been input;

(c) decreasing the duty ratio of the clutch at a predetermined rate; and (d) simultaneously making the duty ratio zero and outputting the down-shift start signal to the transmission.

5. The method of claim 4 wherein in step (d), the down-shift start signal is outputted if a difference between an engine speed and a turbine speed is greater than or equal to a predetermined value.

6. A method for controlling a damper clutch for an automatic transmission comprising:

determining whether a down-shift signal has been input when in a sports mode during a power on state; and controlling a duty of the damper clutch until a transmission control unit outputs a down-shift start signal to a transmission when it is determined that the down-shift signal has been input, wherein controlling the duty of the damper clutch comprises, immediately reducing a duty ratio of the damper clutch to a predetermined value when it is determined that the down-shift signal has been input, decreasing the duty ratio of the clutch at a predetermined rate, and simultaneously making the duty ratio zero and outputting the down-shift start signal to the transmission.

7. The method of claim 6 wherein the down-shift start signal is outputted if a difference between an engine speed and a turbine speed is greater than or equal to a predetermined value.

* * * * *